United States Patent
Watanabe

(10) Patent No.: US 11,117,448 B2
(45) Date of Patent: Sep. 14, 2021

(54) AIR-CONDITIONING CONTROL APPARATUS FOR VEHICLE AND AIR-CONDITIONING CONTROL SYSTEM FOR VEHICLE

(71) Applicant: DENSO CORPORATION, Kariya (JP)

(72) Inventor: Masashi Watanabe, Kariya (JP)

(73) Assignee: DENSO CORPORATION, Kariya (JP)

( * ) Notice: Subject to any disclaimer, the term of this patent is extended or adjusted under 35 U.S.C. 154(b) by 94 days.

(21) Appl. No.: 16/558,401

(22) Filed: Sep. 3, 2019

(65) Prior Publication Data
US 2019/0381864 A1 Dec. 19, 2019

Related U.S. Application Data

(63) Continuation of application No. PCT/JP2018/005622, filed on Feb. 19, 2018.

(30) Foreign Application Priority Data

Mar. 8, 2017 (JP) .............................. JP2017-043563
Dec. 21, 2017 (JP) .............................. JP2017-245174

(51) Int. Cl.
*B60H 1/32* (2006.01)

(52) U.S. Cl.
CPC ......... *B60H 1/3211* (2013.01); *B60H 1/3227* (2013.01); *B60H 2001/3241* (2013.01); *B60H 2001/3277* (2013.01)

(58) Field of Classification Search
CPC .......... B60H 1/3211; B60H 2001/3227; B60H 2001/3241; B60H 2001/4277; B60H 1/3227
See application file for complete search history.

(56) References Cited

U.S. PATENT DOCUMENTS

| 4,111,275 A | * | 9/1978 | Masuda | ............... | B60H 1/3227 |
| | | | | | 123/41.49 |
| 9,616,742 B1 | * | 4/2017 | Uehara | ............... | B60K 11/085 |

(Continued)

FOREIGN PATENT DOCUMENTS

| DE | 102010026323 A1 | 1/2012 |
| DE | 102011011250 A1 | 8/2012 |

(Continued)

*Primary Examiner* — Marc E Norman
(74) *Attorney, Agent, or Firm* — Harness, Dickey & Pierce, P.L.C.

(57) ABSTRACT

An air-conditioning control apparatus includes a determiner and a controller. The determiner is configured to determine whether a subject vehicle is in a slipstream of a preceding vehicle when the subject vehicle is in autonomous control and following the preceding vehicle. The controller is configured to increase a flow rate of air flowing through a condenser for an air-conditioning of the subject vehicle when the determiner determines that the subject vehicle is in the slipstream of the preceding vehicle. According to this, even when the subject vehicle is in the slipstream and following the preceding vehicle during the autonomous control, the flow rate of the air flowing through the condenser can be increased by the controller. Accordingly, the flow rate of the air flowing through the condenser of the subject vehicle can be secured in the condition where the inter-vehicle distance from the preceding vehicle is small during vehicle platooning.

7 Claims, 8 Drawing Sheets

(56) References Cited

U.S. PATENT DOCUMENTS

| | | |
|---|---|---|
| 2014/0138077 A1 | 5/2014 | Ajisaka |
| 2015/0034281 A1 | 2/2015 | Cummins et al. |
| 2018/0154763 A1* | 6/2018 | Dudar .................. G05D 3/00 |

FOREIGN PATENT DOCUMENTS

| | | |
|---|---|---|
| JP | H053012 U | 1/1993 |
| JP | H0558172 A | 3/1993 |
| JP | 2011068232 A | 4/2011 |
| JP | 2012201133 A | 10/2012 |

* cited by examiner

AIR-CONDITIONING CONTROL APPARATUS FOR VEHICLE AND AIR-CONDITIONING CONTROL SYSTEM FOR VEHICLE

CROSS REFERENCE TO RELATED APPLICATION

The present application is a continuation application of International Patent Application No. PCT/JP2018/005622 filed on Feb. 19, 2018, which designated the U.S. and claims the benefit of priority from Japanese Patent Application No. 2017-043563 filed on Mar. 8, 2017, and Japanese Patent Application No. 2017-245174 filed on Dec. 21, 2017. The entire disclosures of all of the above applications are incorporated herein by reference.

TECHNICAL FIELD

The present disclosure relates to an air-conditioning control apparatus for a vehicle and an air-conditioning control system for a vehicle.

BACKGROUND

For example, a conventional vehicle travelling controller is configured to increase the amount of an inflow air flowing into a subject vehicle that is following a preceding vehicle in vehicle platooning by decelerating the subject vehicle to increase an inter-vehicle distance from the preceding vehicle.

SUMMARY

An air-conditioning controller for a vehicle of an aspect of the present disclosure includes a determiner and a controller. The determiner is configured to determine whether a subject vehicle is in a slipstream of a preceding vehicle when the subject vehicle is in autonomous control and following the preceding vehicle. The controller is configured to increase a flow rate of air flowing through a condenser for an air-conditioning of the subject vehicle when the determiner determines that the subject vehicle is in the slipstream of the preceding vehicle.

EMBODIMENTS

Figure 1:
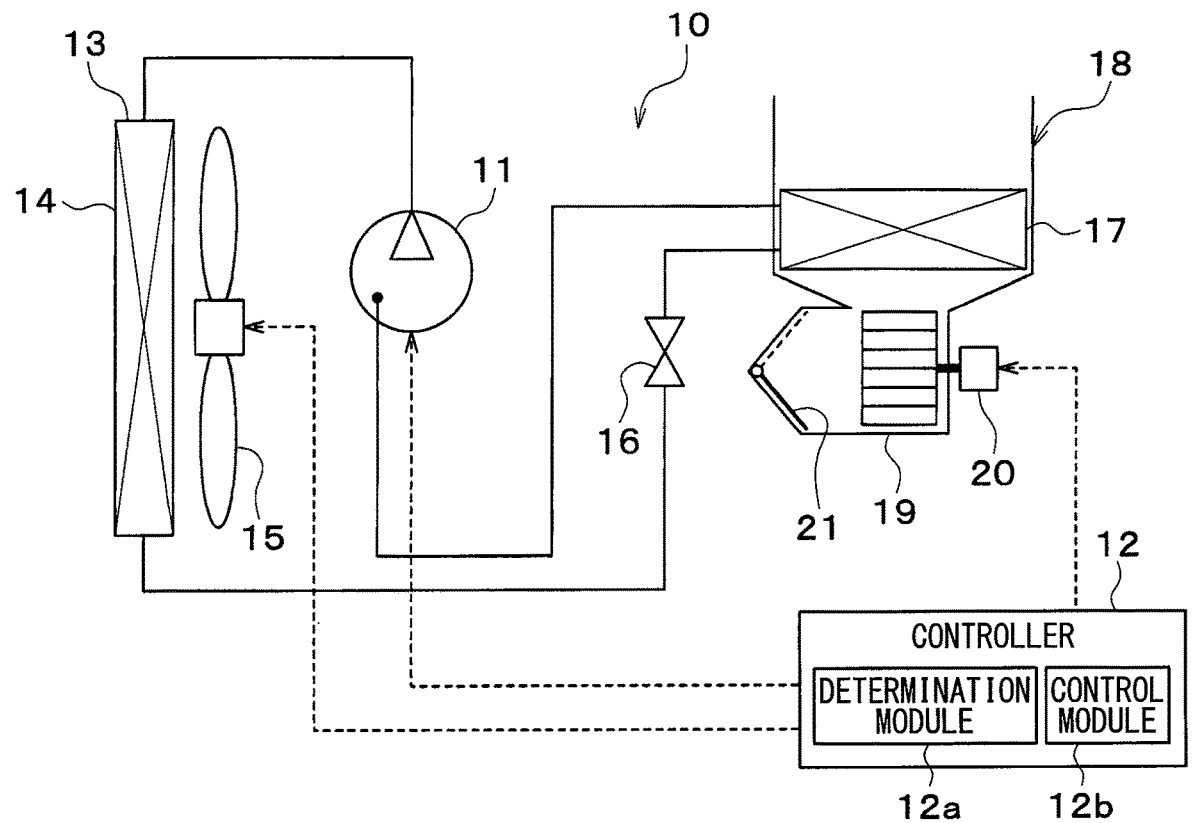
FIG. 1 is a diagram illustrating an air-conditioning device according to at least one embodiment of the present disclosure.

Firstly, a comparative example of the present disclosure will be described. A vehicle travelling controller of the comparative example is configured to increase the amount of an inflow air flowing into a subject vehicle that is following a preceding vehicle in vehicle platooning by decelerating the subject vehicle to increase an inter-vehicle distance from the preceding vehicle.

However, according to the vehicle travelling controller of the comparative example, since the inter-vehicle distance becomes greater during vehicle platooning, an air resistance affecting the traveling subject vehicle becomes large. Accordingly, the fuel economy of the subject vehicle in vehicle platooning may deteriorate.

In contrast, autonomous driving enables vehicle platooning in a condition where the inter-vehicle distance from the preceding vehicle is small. Accordingly, since the subject vehicle enters slipstream of the preceding vehicle, the air resistance affecting the travelling subject vehicle decreases, and thereby the deterioration of the fuel economy of the subject vehicle may be suppressed.

However, since the subject vehicle travels in the slipstream of the preceding vehicle, the amount of the inflow air flowing into the subject vehicle in the vehicle platooning may decrease. Accordingly, since wind may be unlikely to hit a condenser, the amount of the air required for air-conditioning may not be secured, and the refrigeration cycle may become less efficient because of pressure increase. The power for the air-conditioning may increase to avoid this, and accordingly the fuel economy of the subject vehicle may deteriorate.

Hereinafter, embodiments for carrying out the present disclosure will be described with reference to the drawings. In each embodiment, portions corresponding to the elements described in the preceding embodiments are denoted by the same reference numerals, and redundant explanation may be omitted. In each of the embodiments, when only a part of the configuration is described, the other parts of the configuration can be applied to the other embodiments described above. The parts may be combined even if it is not explicitly described that the parts can be combined. The embodiments may be partially combined even if it is not explicitly described that the embodiments can be combined, provided there is no harm in the combination.

Hereinafter, embodiments will be described with reference to the drawings. In the following embodiments, identical or equivalent constituent elements are designated with identical symbols.

First Embodiment

A first embodiment will be described with reference to the drawings. An air-conditioning device 10 shown in FIG. 1 is installed in a vehicle and performs an air-conditioning control for cooling, with a refrigeration cycle, air blown into a passenger compartment that is an air-conditioning target space.

A compressor 11 is provided in an engine room, and draws, compresses and discharges refrigerant. Although not shown, the compressor 11 includes an inverter and a housing integrated with each other. The housing has a refrigerant inlet through which the refrigerant flows therein, and a refrigerant outlet through which the refrigerant taken in through the refrigerant inlet is discharged after being compressed. The housing accommodates an electric motor (not shown) and a compression mechanism compressing the refrigerant.

The operation of the electric motor is controlled according to a control signal from a control device 12 described later. Specifically, a rotational speed of the electric motor is controlled. The compression mechanism compresses the refrigerant and is actuated by the electric motor. The compression mechanism is, for example, a scroll-type compression mechanism. The control device 12 is configured to send an instruction of a target rotational speed to the inverter, and the inverter controls the rotational speed of the electric motor. Thus a refrigerant discharge capacity of the compression mechanism is changed. The inverter actuates a power device according to the control signal input from the control device 12 to rotate the electric motor.

The refrigerant outlet of the compressor 11 is connected to a refrigerant inlet of the condenser 13 for air-conditioning. The condenser 13 is configured to exchange heat between the outside air and the refrigerant having high temperature and high pressure flowing therethrough. The condenser 13 is provided in the engine room. That is, the condenser 13 is a heat exchanger that works as a radiator dissipating heat of the refrigerant having high temperature and high pressure during the cooling operation. In the present embodiment, the condenser is arranged such that an air inflow surface 14 of the condenser 13 is substantially perpendicular to the ground.

An electric fan 15 is located in a path of air flowing toward the condenser 13. The electric fan 15 is disposed on the rear side of the vehicle with respect to the condenser 13. The electric fan 15 is an electric blower whose operation rate (i.e. rotational speed) is controlled in accordance with control voltage output from the control device 12. That is, the amount of the air blown by the electric fan 15 is controlled by the control device 12. Since the flow rate of the air flowing through the condenser 13 and required for air-conditioning can be secured without actuating the electric fan 15 when the vehicle speed is at or above a reference value during traveling alone, the electric fan 15 is controlled to stop when the vehicle speed is at or above the reference value.

An outlet of the condenser 13 is connected to a mechanical expansion valve 16. The expansion valve 16 is a decompressor configured to decompress and expand the refrigerant flowing out of the condenser 13 during the cooling operation. An outlet of the expansion valve 16 is connected to a refrigerant inlet of an evaporator 17.

The evaporator 17 is disposed in a casing 19 of an inside air-conditioning unit 18. The evaporator 17 is a cooling heat exchanger for cooling the air blown to the passenger compartment by heat exchange between the air and the refrigerant flowing through the evaporator 17. A refrigerant outlet of the evaporator 17 is connected to the inlet of the compressor 11.

The inside air-conditioning unit 18 is disposed inside an instrument panel positioned front-most in the passenger compartment. The inside air-conditioning unit 18 accommodates a blower 20 and the evaporator 17, for example, in the casing 19 that forms an outer shell of the inside air-conditioning unit 18. An inside-outside air switching device 21 for selectively introducing inside air and outside air is disposed on the most upstream side of the flow of the air within the casing 19. The inside air is the air inside the passenger compartment.

The inside-outside air switching device 21 is an inside-outside air switching means configured to continuously adjust, with an inside-outside air switching door, an opening area of an inside air inlet through which the inside air flows into the casing 19 and an opening area of an outside air inlet through which the outside air flows into the casing 19. The inside-outside air switching device 21 continuously changes an introduction ratio between the inside air and the outside air to switch an air intake mode.

The blower 20 that supplies air introduced through the inside-outside air switching device 21 toward the passenger compartment is located downstream of the inside-outside air switching device 21 with respect to the airflow. The blower 20 is an electric blower which drives a centrifugal multi-blade fan by an electric motor. A rotational speed, that is, the flow rate of the air blown by the blower 20 is controlled by a control voltage output from the control device 12. The blower 20 is, for example, a sirocco fan.

The control device 12 is a vehicular air-conditioning controller that controls the air-conditioning of the subject vehicle. The control device 12 is an electronic control unit (ECU) that includes a known microcontroller including a CPU, a ROM, and a RAM, and a peripheral circuit thereof.

The control device 12 receives sensor signals from a sensor group for air-conditioning control which includes an inside air sensor, an outside air sensor, a solar irradiance sensor, and a high-pressure side pressure sensor that detects the pressure of the refrigerant in the condenser 13 which are not shown, for example. The control device 12 receives operation signals from air-conditioning control switches provided on an operation panel (not shown) located around the instrument panel that is located front-most in the passenger compartment.

The control device 12 executes various arithmetic operation and processing in accordance with an air-conditioning control program stored in the ROM. Thereby, the control device 12 controls the operation of various air-conditioning control devices by outputting the control signals to the air-conditioning control devices such as the inverter of the compressor 11, the electric fan 15, and the blower 20. The control device 12 actuates the electric fan 15 as required for air-conditioning not only during the autonomous control.

Further, the control device 12 increases the amount of the air flowing through the condenser 13 of the subject vehicle 100 when a predetermined condition is fulfilled in vehicle platooning during the autonomous control. Accordingly, the control device 12 includes a determiner 12a and a controller 12b. The determiner 12a determines whether the subject vehicle is in autonomous control and whether the subject vehicle is in vehicle platooning. The controller 12b performs the control in accordance with the determination of the determiner 12a.

The determiner 12a is configured to determine whether the subject vehicle is in a slipstream of the preceding vehicle when the subject vehicle is in autonomous control and following the preceding vehicle. The controller 12b is configured to increase the flow rate of air flowing through the condenser 13 for an air-conditioning of the subject vehicle when the determiner 12b determines that the subject vehicle is in the slipstream of the preceding vehicle. The details of the slipstream detection are not essential to this disclosure. In particular, well known and conventional techniques may be used to determine whether the subject vehicle is within the slipstream of the vehicle in front of the subject vehicle. For example, JP 2012-201133A discloses a specific controller that is programmed to determine whether the subject vehicle is within the slipstream of the vehicle in front of the subject vehicle, in particular with respect to FIGS. 4A and 4B which are flowcharts showing specific steps of this determination. This technique in JP 2012-201133A is incorporated herein by reference.

For the determination of the autonomous control and the vehicle platooning, the control device 12 obtains various information such as information indicating the autonomous control, the speed of the subject vehicle, the inter-vehicle distance from the preceding vehicle, information about the preceding vehicle such as the type and the speed of the vehicle via a vehicle-to-vehicle communication, and information about the preceding vehicle obtained via analysis of a picture of the preceding vehicle taken by a camera. The information about the type of the preceding vehicle is used for determining whether the subject vehicle is in the slipstream of the preceding vehicle. The above description relates to an entire configuration of the air-conditioning device 10 according to the present embodiment.

Figure 2:
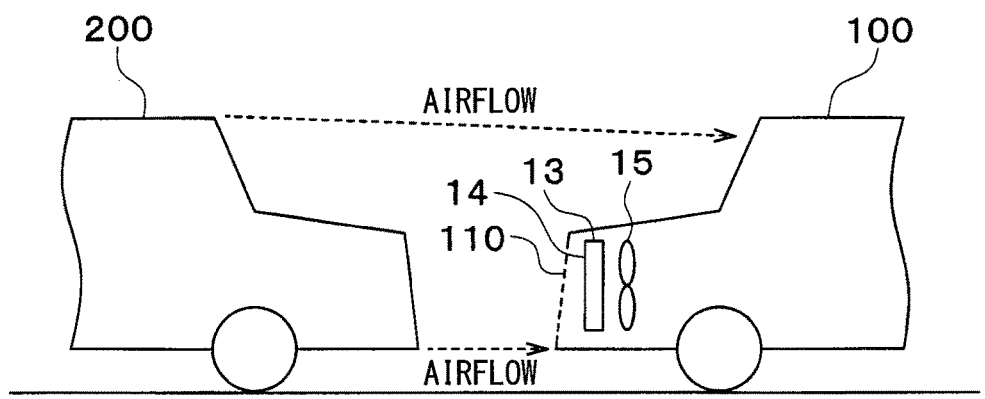
FIG. 2 is a schematic diagram illustrating a vehicle platooning of an autonomous control.

Next, an operation control process of the control device 12 for the electric fan 15 when the subject vehicle 100 is in autonomous control and following the preceding vehicle 200 as shown in FIG. 2 will be described. The operation control process is executed by the determiner 12a and the controller 12b.

Since the preceding vehicle 200 travels in front of the subject vehicle 100 during vehicle platooning, the airflow is different from a normal condition, and the subject vehicle 100 is less likely to be affected by air resistance. That is, the flow rate of the air flowing into the condenser 13 through a grille 110 provided on a front side of the subject vehicle 100 decreases. It does not matter whether the preceding vehicle 200 is in autonomous control.

Figure 3:
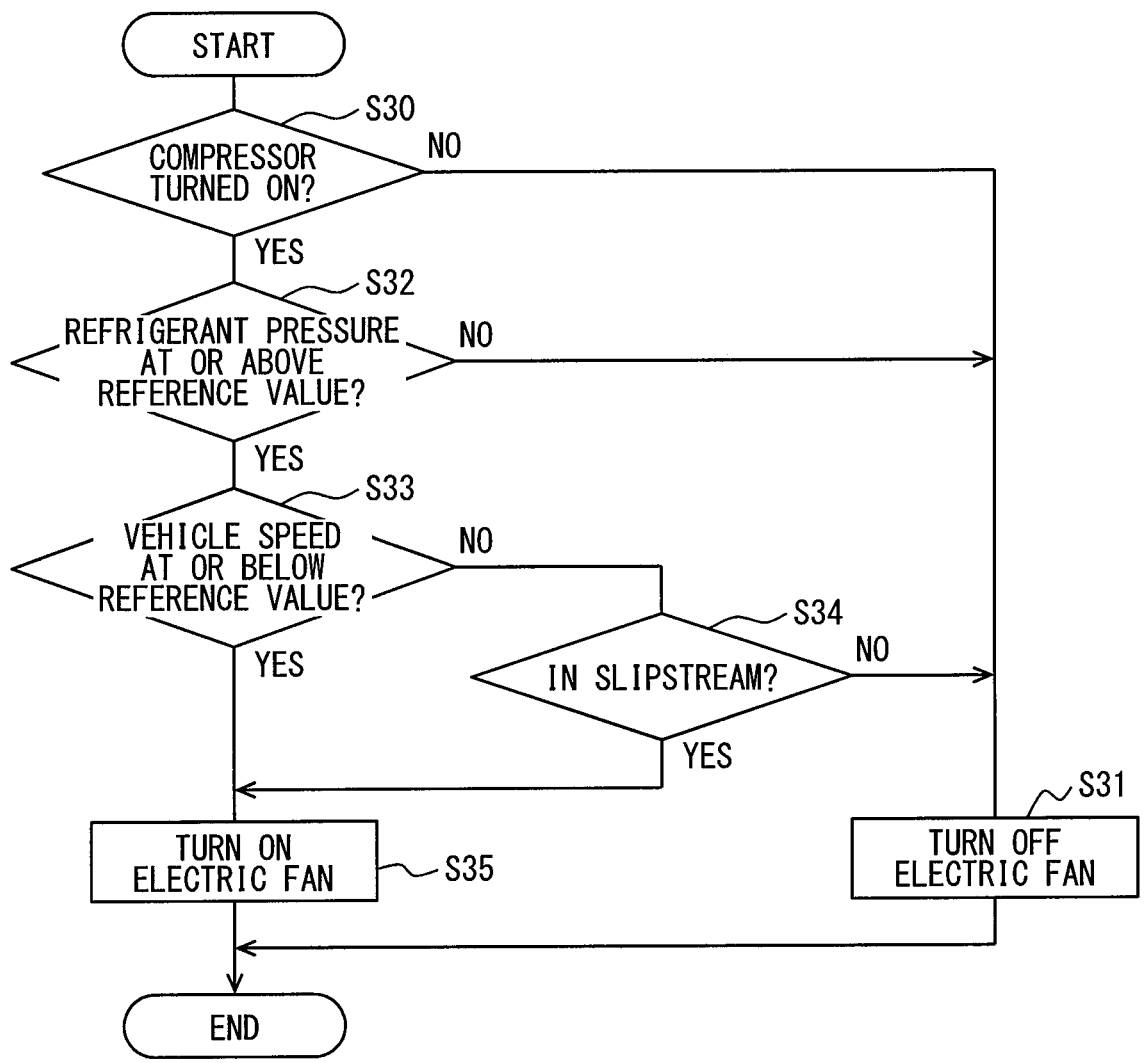
FIG. 3 is a flowchart showing a flow of a operation control process executed by the controller.

The operation control process shown in FIG. 3 is repeatedly performed in accordance with preset timings and conditions. First, in step S30, it is determined whether the compressor 11 is turned on. That is, it is determined whether the air-conditioning device 10 is performing the cooling operation. The operation of the compressor 11 is grasped by the control device 12.

When it is determined that the compressor 11 is not in operation in step S30, the process proceeds to step S31. In step S31, the electric fan 15 is turned off, or the electric fan 15 is kept off, and then the operation control process ends.

When it is determined that the compressor 11 is in operation in step S30, the process proceeds to step S32. In step S32, it is determined whether the refrigerant pressure in the condenser 13 is at or above a reference value. When the refrigerant pressure in the condenser 13 is below the reference value, the cooling capacity is not impaired. Accordingly, the process proceeds to step S31 to turn the electric fan 15 off, and then the operation control process ends. In contrast, when it is determined that the refrigerant pressure in the condenser 13 is at or above the reference value in the step S32, the process proceeds to step S33. In step S33, it is determined whether the speed of the vehicle is at or below a reference value. When the speed of the vehicle is above the reference value, that is when the vehicle is traveling at a speed exceeding a reference speed, the process proceeds to step S34. When the speed of the vehicle is at or below the reference value, it is determined that the flow rate of the air flowing into the condenser 13 is insufficient, and then the process proceeds to step S35.

In step S34, the determiner 12a determines whether the subject vehicle 100 is in the slipstream of the preceding vehicle 200. This is determined based on the speed of the subject vehicle 100, the inter-vehicle distance from the preceding vehicle, and the type of the preceding vehicle, for example. When it is determined that the subject vehicle 100 is not in the slipstream of the preceding vehicle 200, the process proceeds to step S31 to turn the electric fan 15 off, and then the operation control process ends. When it is determined that the subject vehicle 100 is in the slipstream of the preceding vehicle 200, the process proceeds to step S35.

In step S35, the controller 12b turns on the electric fan 15. According to this, since the electric fan 15 located in the path of the air flowing toward the condenser 13 is actuated, the flow rate of the air flowing into the condenser 13 through the grille 110 increases. Accordingly, the required amount of the air for air-conditioning flows into the condenser 13.

That is, the condition for turning on the electric fan 15 in vehicle platooning during autonomous control is that: the compressor 11 is in operation; the refrigerant pressure in the condenser 13 is at or above the reference value; and the speed of the vehicle is at or below the reference speed. Alternatively, the condition is that: the refrigerant pressure in the condenser 13 is at or above the reference value; the speed of the vehicle is above the reference speed; and the subject vehicle 100 is in the slipstream of the preceding vehicle 200. Thus, the operation control process ends and is repeated.

As described above, in the present embodiment, the controller 12b forcibly turns on the electric fan 15 when the subject vehicle 100 is in the slipstream of the preceding vehicle 200 in vehicle platooning during autonomous control. According to this, the flow rate of the air flowing into the condenser 13 can be increased. Accordingly, the flow rate of the air flowing through the condenser 13 of the subject vehicle 100 can be secured in the condition where the inter-vehicle distance from the preceding vehicle 200 is small during vehicle platooning.

Further, since the pressure increase of the refrigerant can be suppressed, the deterioration of the refrigeration cycle can be suppressed. Accordingly, the increase in the air-conditioning power can be suppressed, and thereby the deterioration of the fuel economy of the subject vehicle 100 can be suppressed.

Second Embodiment

Figure 4:
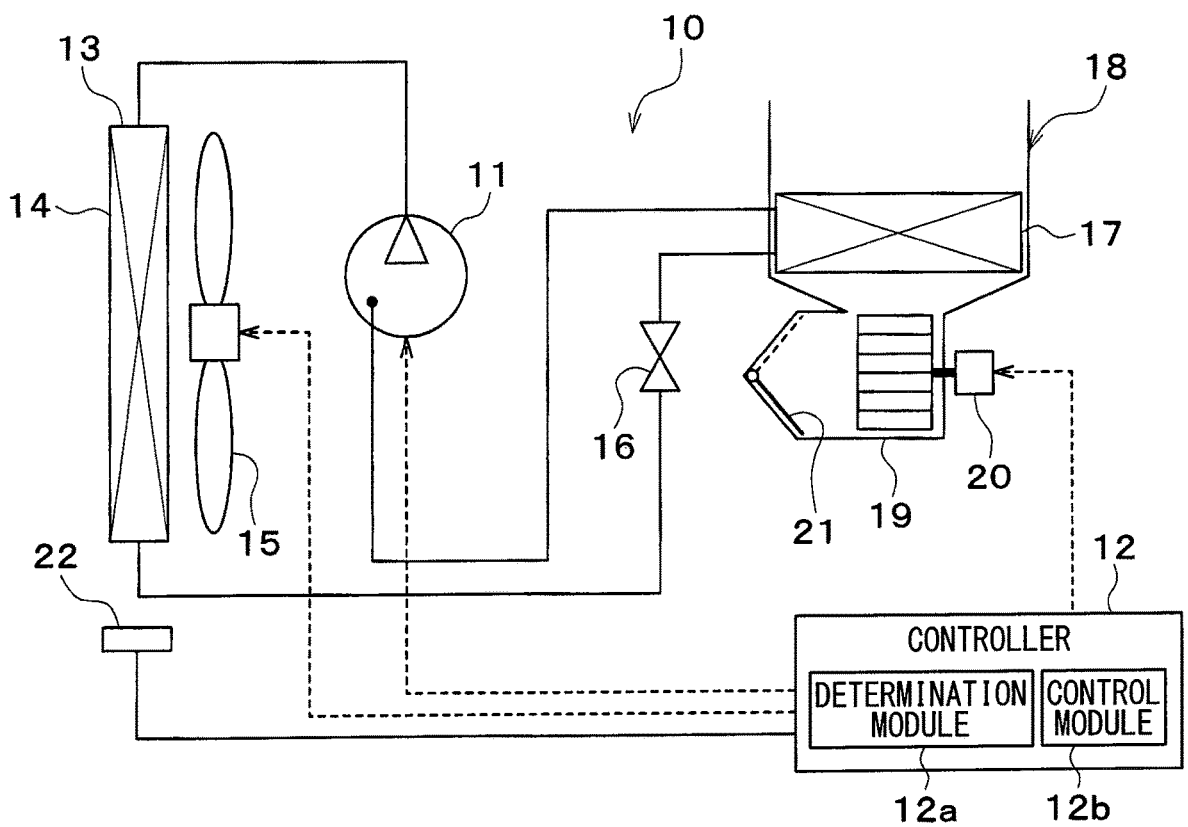
FIG. 4 is a diagram illustrating an air-conditioning device according to at least one embodiment of the present disclosure.

In the present embodiment, configurations different from those of the first embodiment will be described. As shown in FIG. 4, a shutter mechanism 22 is provided on a ground side of the condenser 13 of the subject vehicle 100. The shutter mechanism 22 allows and shuts off an inflow of the air into the air inflow surface 14 from the ground side. Opening and Closing of the shutter mechanism 22 is controlled by the controller 12b. The grille 110 opens at the front of the subject vehicle 100.

Figure 5:
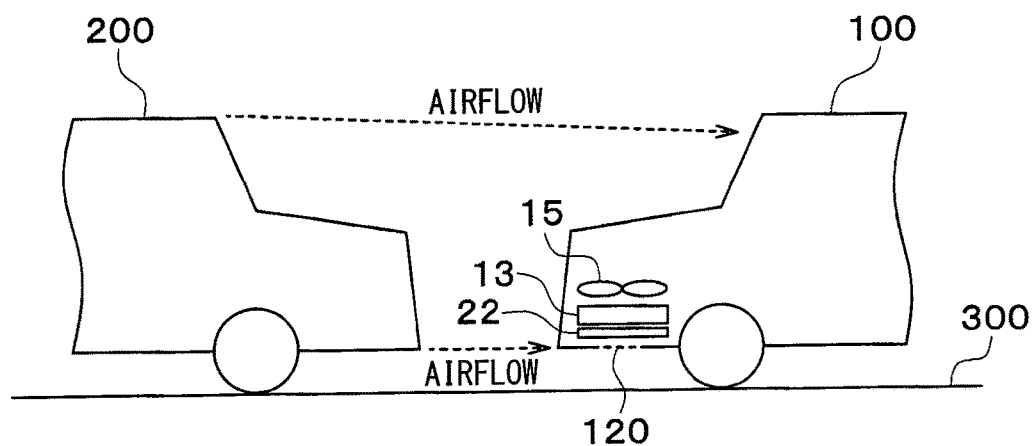
FIG. 5 is a schematic diagram illustrating a vehicle platooning of an autonomous control according to at least one embodiment.

As shown in FIG. 5, the condenser 13 is arranged in the subject vehicle 100 such that the air inflow surface 14 faces a ground 300. The shutter mechanism 22 is configured to allow the air required for air-conditioning to flow into the air inflow surface 14 of the condenser 13 through a grille provided on the ground side even in a closed state, for example. When the shutter mechanism 22 is in an open state, the flow rate of the air flowing into the air inflow surface 14 increases compared with in the closed state. The flow rates of the air flowing into the condenser 13 in the open state and the closed state of the shutter mechanism 22 may be appropriately designed.

When the controller 12b determines that the subject vehicle is in the slipstream of the preceding vehicle 200 and following the preceding vehicle 200 during the autonomous control as in the step S34, the controller 12b allows the air to flow into the air inflow surface 14 of the condenser 13 by opening the shutter mechanism 22. Accordingly, the flow rate of the air flowing into the condenser 13 from the ground 300 side can be increased without turning on the electric fan 15. In contrast, when the subject vehicle 100 moves out of the slipstream of the preceding vehicle 200, the controller 12b adjusts the flow rate of the air flowing into the condenser 13 by closing the shutter mechanism 22.

Although the controller 12b performs at least the determination of the slipstream and the open-close control of the shutter mechanism 22, these may be combined with the operation control process of the first embodiment shown in FIG. 3. As a modification example, in the operation control process shown in FIG. 3, the step S35 may be changed to "opening the shutter mechanism 22", and the step S31 may be changed to "closing the shutter mechanism 22".

As another modification example, in the operation control process shown in FIG. 3, the step S35 may be changed to "turning on the electric fan 15 and opening the shutter mechanism 22", and the step S31 may be changed to "turning off the electric fan 15 and closing the shutter mechanism 22".

Third Embodiment

Figure 6:
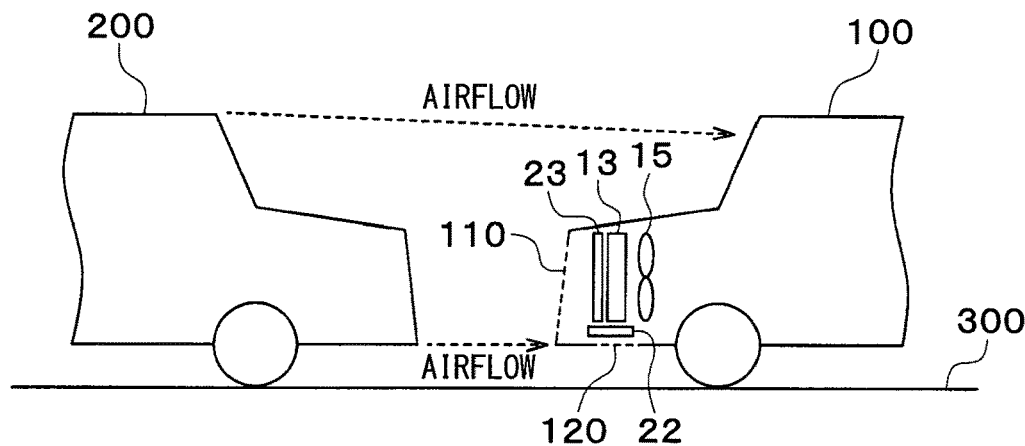
FIG. 6 is a schematic diagram illustrating a vehicle platooning of an autonomous control according to at least one embodiment of the present disclosure.

In the present embodiment, configurations different from those of the first and second embodiments will be described. As shown in FIG. 6, the condenser 13 is arranged in the engine room of the subject vehicle 100 such that the air inflow surface 14 is perpendicular to the ground 300. Further, a first shutter mechanism 23 and a second shutter mechanism 22 which are opened and closed by the controller 12b are provided in the subject vehicle 100.

The first shutter mechanism 23 is a grille shutter provided on the front side of the vehicle. The first shutter mechanism 23 is configured to allow and shut off the inflow of the air into the condenser 13 from the front side of the subject vehicle 100. The second shutter mechanism 22 is a grille shutter provided on the lower side of the vehicle. The first shutter mechanism 22 is configured to allow and shut off the inflow of the air into the condenser 13 from the ground 300 side of the subject vehicle 100. When the subject vehicle 100 is not in the slipstream of the preceding vehicle 200, the first shutter mechanism 23 is open and the second shutter mechanism 22 is closed. The first shutter mechanism 23 and the second shutter mechanism 22 may be located adjacent to the condenser 13. The first shutter mechanism 23 and the second shutter mechanism 22 may be close to the grilles 110, 120 of the subject vehicle 100.

When the controller 12b determines that the subject vehicle 100 is in the slipstream and following the preceding vehicle during the autonomous control as in the step S34, the controller 12b shuts off the inflow of the air into the air inflow surface 14 through the grille 110 and the first shutter mechanism 23 by closing the first shutter mechanism 23. Further, the controller 12b allows the air to flow into the air inflow surface 14 through the grille 120 and the second shutter mechanism 22 by opening the second shutter mechanism 22. Accordingly, the flow rate of the air flowing into the condenser 13 from the ground 300 side not from the front side of the subject vehicle 100 can be increased.

As a modification example, as in the second embodiment, the present embodiment may be combined with the operation control process of the first embodiment shown in FIG. 3. As a modification example, in the operation control process shown in FIG. 3, the step S35 may be changed to "opening the second shutter mechanism 22", and the step S31 may be changed to "closing the second shutter mechanism 22".

As another modification example, in the operation control process shown in FIG. 3, the step S35 may be changed to "turning on the electric fan and opening the second shutter mechanism 22", and the step S31 may be changed to "turning off the electric fan 15 and closing the second shutter mechanism 22".

As another modification example, the first shutter mechanism 23 may be omitted. That is, only the second shutter mechanism 22 provided on the ground 300 side may be controlled to be open and closed.

Fourth Embodiment

Figure 7:
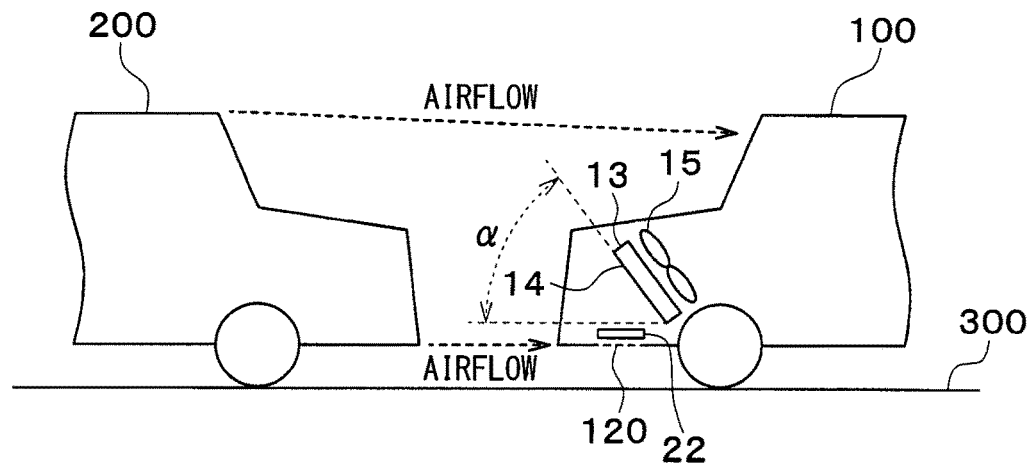
FIG. 7 is a schematic diagram illustrating a vehicle platooning of an autonomous control according to at least one embodiment of the present disclosure.

In the present embodiment, configurations different from those of the second embodiment will be described. As shown in FIG. 7, the condenser 13 is tilted to the front side of the subject vehicle 100. Specifically, an angle between the air inflow surface 14 of the condenser 13 and the ground 300 is defined as an angle α. The condenser 13 is arranged in the subject vehicle 100 and the air inflow surface 14 is tilted to the front side of the subject vehicle 100 such that 0°<α<90°.

For example, when 20°≤α≤30°, the flow of the air flowing into the air inflow surface 14 of the condenser 13 from the ground 300 side through the shutter mechanism 22 can be improved. In view of the arrangement of the other components in the subject vehicle 100, the angle α may be preferable to be 0°<α≤60°. The angle α may be at 45° or around 45° such that the air is easily taken into the condenser 13 through the front grille of the subject vehicle 100 even when the subject vehicle 100 is not in the slipstream of the preceding vehicle 200.

As described above, since the angle α of the air inflow surface 14 of the condenser 13 is 0°<α<90° not at 0° as in the second embodiment, the air taken from the ground 300 side of the subject vehicle 100 can be efficiently used for heat exchange.

Fifth Embodiment

Figure 8:
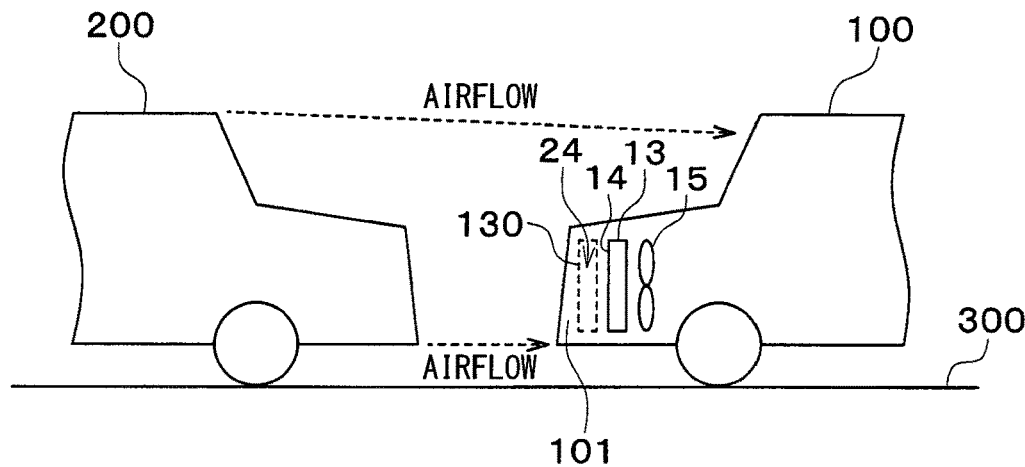
FIG. 8 is a schematic diagram illustrating a vehicle platooning of an autonomous control according to at least one embodiment of the present disclosure.

In the present embodiment, configurations different from those of the first to fourth embodiments will be described. As shown in FIG. 8, grilles 130 for taking in the air to condensers 13 are provided on lateral sides 101 of the subject vehicle 100. Shutter mechanisms 24 are provided with the grilles 130.

The shutter mechanisms 24 are grill shutters provided on the lateral sides of the vehicle. The shutter mechanisms 24 are configured to allow and shut off the inflow of the air into the condensers 13 from the lateral sides 101 of the subject vehicle 100. Opening and Closing of the shutter mechanism 24 is controlled by the controller 12b.

The grille 130 is located between the most front part of the lateral side 101 of the subject vehicle 100 and the most rear part of the condenser 13. At least a part of the grille 130 is closer to the front side of the vehicle than the air inflow surface 14 of the condenser 13 is to. A width of the grille 130 in the vehicle front-rear direction is appropriately designed.

The determiner 12a is configured to determine whether the subject vehicle 100 is in the slipstream of the preceding vehicle 200 as in the step S34 when the subject vehicle 100 is in autonomous control and in vehicle platooning. When the determiner 12a determined that the subject vehicle 100 is in the slipstream of the preceding vehicle 200, the controller 12b allows the air to flow in the air inflow surfaces 14 of the condensers 13 from the lateral sides 101 of the subject vehicle 100 by opening the shutter mechanisms 24.

Accordingly, the flow rates of the air flowing into the condensers 13 from the lateral sides 101 of the subject vehicle 100 can be increased without turning on the electric fans 15. In contrast, when the subject vehicle 100 moves out of the slipstream of the preceding vehicle 200, the controller 12b adjusts the flow rate of the air flowing into the condensers 13 by closing the shutter mechanisms 24.

Although the controller 12b performs at least the determination of the slipstream and the open-close control of the shutter mechanisms 24, these may be combined with the operation control process of the first embodiment shown in FIG. 3. That is, in the operation control process shown in FIG. 3, the step S35 may be changed to "opening the shutter mechanisms 24 and turning on the electric fans 15", and the step S31 may be changed to "closing the shutter mechanisms 24 and turning off the electric fans 15".

Figure 9:
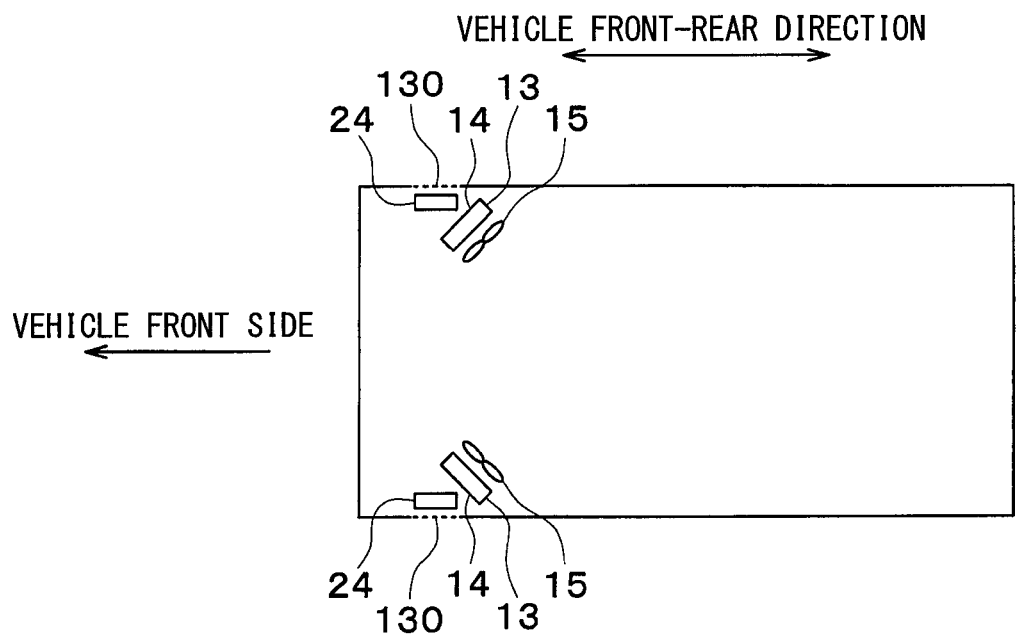
FIG. 9 is a plan view showing an angle of an air inflow surface of a condenser according to at least one embodiment.

As another modification example, the air inflow surface 14 of the condenser 13 may be tilted toward the lateral side 101 in the vehicle front-rear direction as shown in FIG. 9. According to this, the air may easily flow into the air inflow surfaces 14 of the condensers 13 through the grilles 130. As in the fourth embodiment, the air inflow surface 14 of the condenser 13 may be tilted with respect to the ground 300.

Sixth Embodiment

Figure 10:
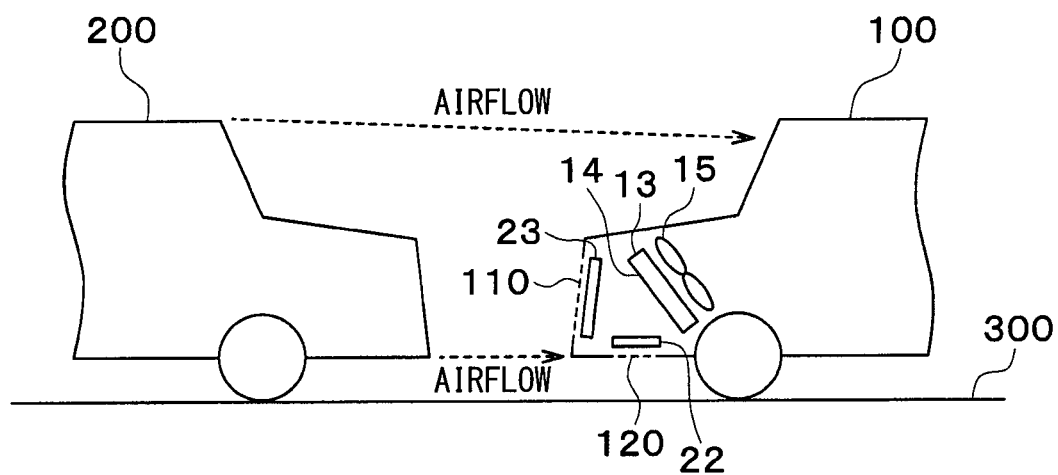
FIG. 10 is a schematic diagram illustrating a vehicle platooning of an autonomous control according to at least one embodiment of the present disclosure.

In the present embodiment, configurations different from those of the first to fourth embodiments will be described. As shown in FIG. 10, the condenser 13 is arranged in the subject vehicle 100 and the air inflow surface 14 is tilted to the front side of the subject vehicle 100 such that $0° < a < 90°$ as in the fourth embodiment.

Figure 11:
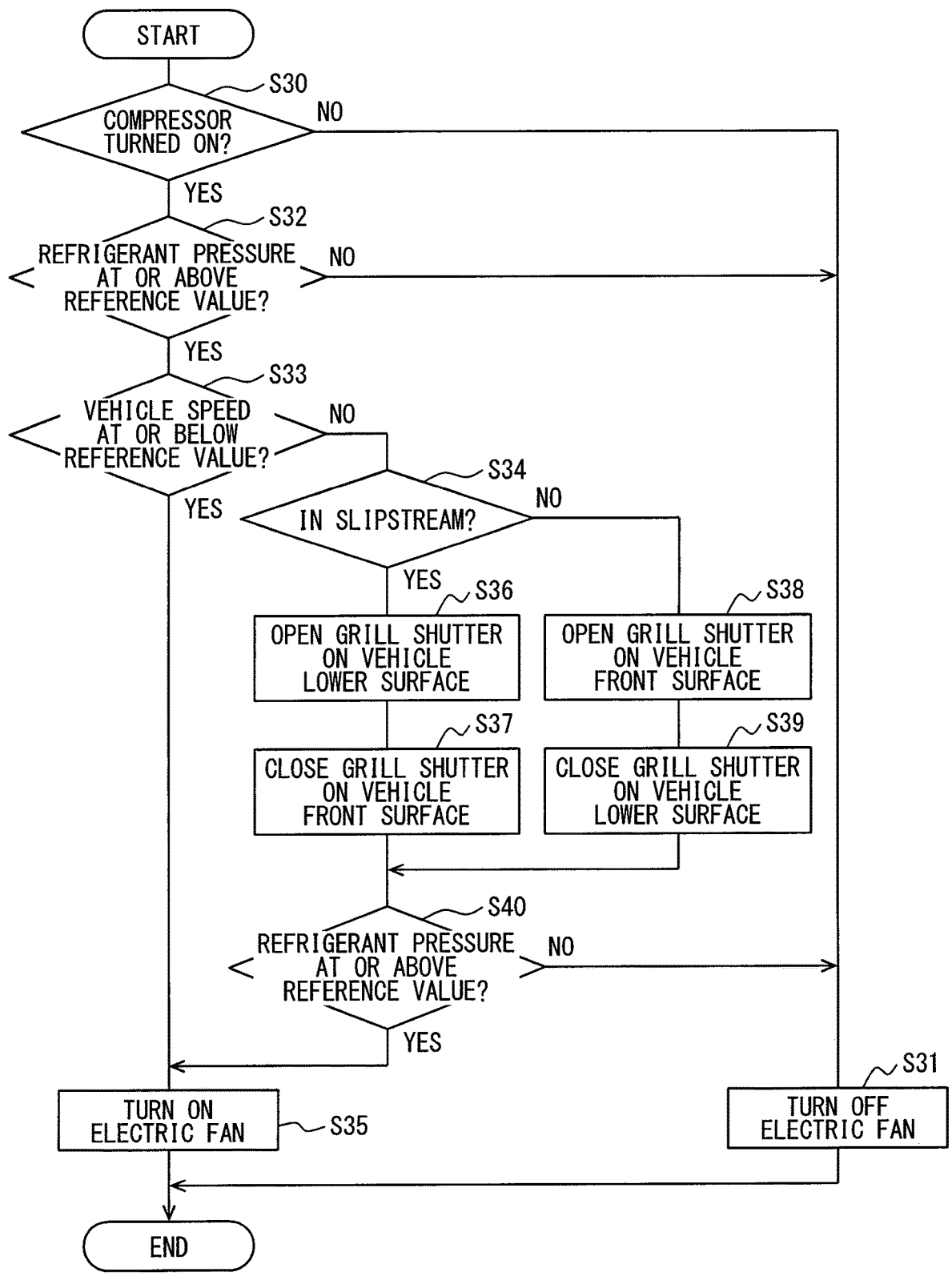
FIG. 11 is a flowchart showing a flow of an operation control process executed by the controller according to at least one embodiment.

Next, an operation control process shown in FIG. 11 will be described. The steps S30 to S35 shown in FIG. 11 are the same as the first embodiment.

When it is determined that the subject vehicle 100 is in the slipstream of the preceding vehicle 200 in the step S34, the process proceeds to step S36. In the step S36, the second shutter mechanism 22 is opened. That is, the second shutter mechanism 22 allows the air to flow into the condenser 13 from the ground 300 side of the subject vehicle 100.

According to this, the flow rate of the air flowing into the condenser 13 from the ground 300 side can be increased. Since the condenser 13 is tilted toward the vehicle front side, the air easily flows into the air inflow surface 14 through the second shutter mechanism 22 on the ground 300 side.

Subsequently, in the step S37, the first shutter mechanism 23 is closed. That is, the first shutter mechanism 23 shuts off the air flowing into the condenser 13 from the front side of the subject vehicle 100. Accordingly, the air taken in the subject vehicle 100 from the ground 300 side of the subject vehicle 100 can be limited from flowing out of the subject vehicle 100 through the grille 110 and the first shutter mechanism 23.

When it is determined that the subject vehicle 100 is not in the slipstream of the preceding vehicle 200 in the step S34, the process proceeds to step S38. In the step S38, the first shutter mechanism 23 allows the air to flow into the condenser 13 from the front side of the subject vehicle 100.

Subsequently, in step S39, the second shutter mechanism 22 shuts off the air flowing into the condenser 13 from the ground 300 side of the subject vehicle 100. Accordingly, the air is taken in the subject vehicle 100 through the first shutter mechanism 23 from the front side of the subject vehicle 100 when the subject vehicle 100 is not in the slipstream of the preceding vehicle 200.

Subsequently, in step S40, it is determined whether the refrigerant pressure in the condenser 13 is at or above a reference value as in the step S32. When the refrigerant pressure in the condenser 13 is not at or above the reference value, the process proceeds to the step S31. Then the electric fan 15 is turned off, and the operation control process ends.

In contrast, when it is determined that the refrigerant pressure in the condenser 13 is at or above the reference value in the step S38, the process proceeds to step S35. Then the electric fan 15 is turned on, and the operation control process ends.

As a modification example, the electric fan 15 may not be actuated. In this case, the determiner 12a determines whether the subject vehicle 100 is in the slipstream of the preceding vehicle 200 as in the step S34. When the subject vehicle 100 is not in the slipstream of the preceding vehicle 200, the controller 12b opens the first shutter mechanism 23 and closes the second shutter mechanism 22. Thus, the air flows into the condenser 13 from the front side of the subject vehicle 100.

In contrast, when the determiner 12a determined that the subject vehicle 100 is in the slipstream of the preceding vehicle 200, the controller 12b shuts off the air flowing into the air inflow surface 14 of the condenser 13 through the first shutter mechanism 23 by closing the first shutter mechanism 23. Further, the controller 12b allows the air to flow into the air inflow surface 14 of the condenser 13 through the second shutter mechanism 22 by opening the second shutter mechanism 22. Accordingly, the flow rates of the air flowing into the condensers 13 from the ground 300 side of the subject vehicle 100 can be increased without turning on the electric fan 15.

As another modification example, the first shutter mechanism 23 may be opened in the step S38 and the second shutter mechanism 22 may be opened in the step S39 when it is determined that the subject vehicle 100 is not in the slipstream of the preceding vehicle 200 in the step S34. That is, both the first shutter mechanism 23 and the second shutter mechanism 22 may be opened.

As another example, the first shutter mechanism 23 may be omitted from the subject vehicle 100. In this case, the air is always allowed to flow into the subject vehicle 100 from the front side, and the air is taken in from the ground 300 side when the subject vehicle 100 is in the slipstream of the preceding vehicle 200.

Seventh Embodiment

Figure 12:
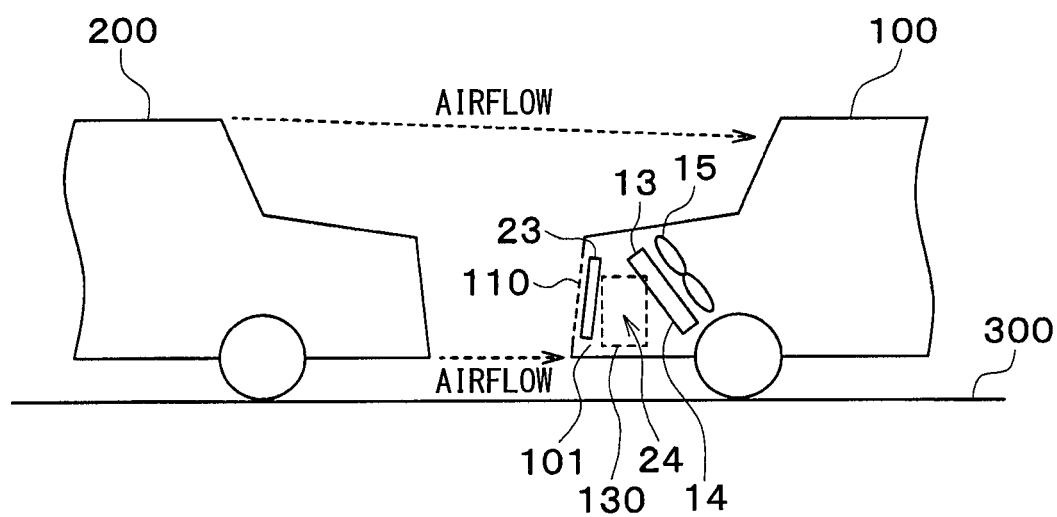
FIG. 12 is a schematic diagram illustrating a vehicle platooning of an autonomous control according to at least one embodiment of the present disclosure.

In the present embodiment, configurations different from those of the first to fifth embodiments will be described. As shown in FIG. 12, the first shutter mechanism 23 and the third shutter mechanisms 24 are provided in the subject vehicle 100. Accordingly, the inflow of the air flowing into the subject vehicle 100 from the front side and the lateral sides 101 can be allowed and shut off respectively. When the subject vehicle 100 is not in the slipstream of the preceding vehicle 200, the first shutter mechanism 23 is open and the third shutter mechanisms 24 is closed.

Figure 13:
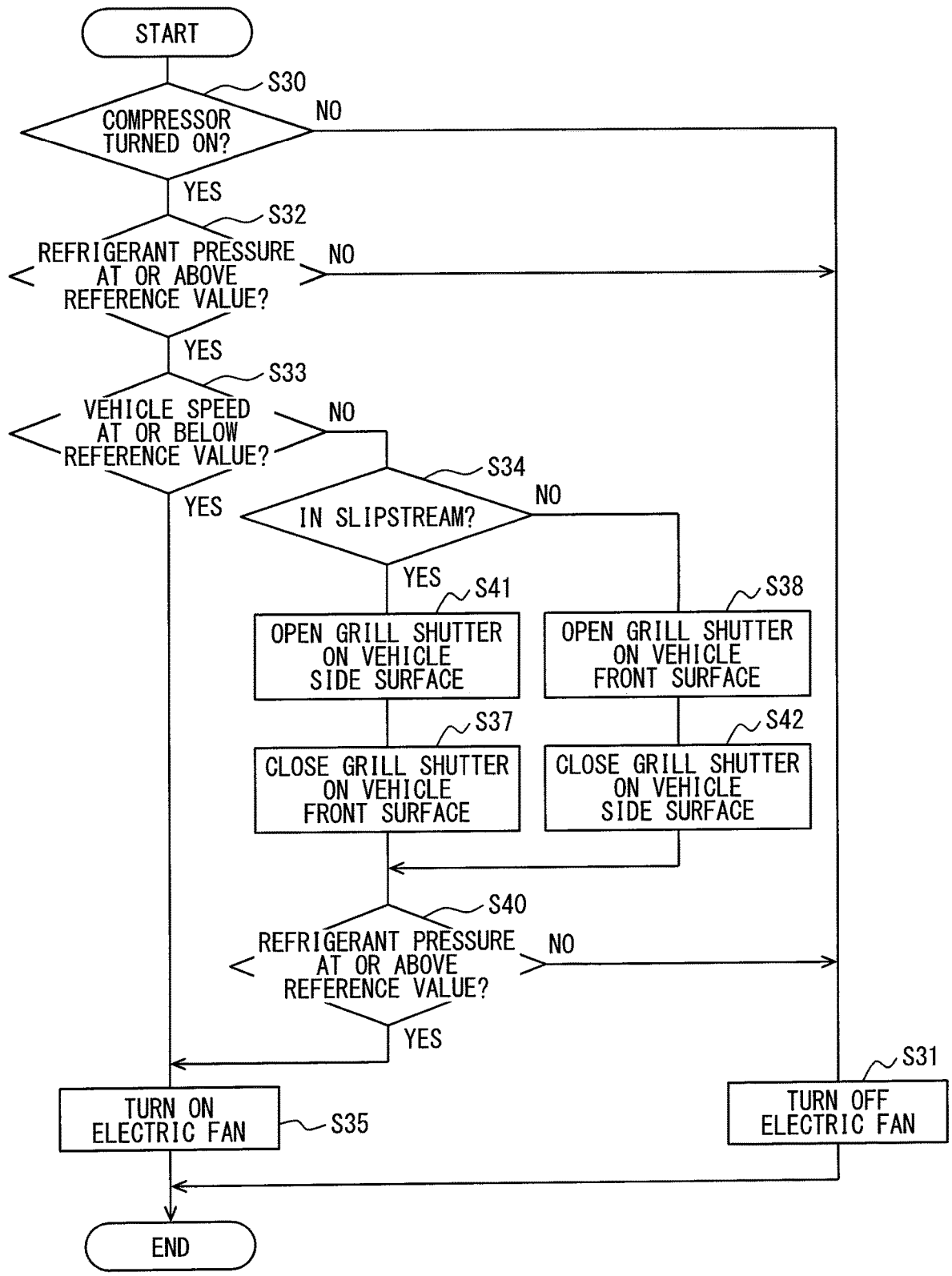
FIG. 13 is a flowchart showing a flow of an operation control process executed by the controller according to at least one embodiment.

Next, an operation control process shown in FIG. 13 will be described. The steps S30 to S35, S37, S38, and S40 shown in FIG. 13 are the same as the sixth embodiment.

In the present embodiment, when it is determined that the subject vehicle 100 is in the slipstream of the preceding vehicle 200 in the step S34, the process proceeds to step S41. In the step S41, the third shutter mechanisms 24 are opened. That is, the third shutter mechanisms 24 allow the air to flow into the condensers 13 from the lateral sides 101 of the subject vehicle 100. Subsequently, the process proceeds to the step S37, and the above-described process is performed.

In contrast, when it is determined that the subject vehicle 100 is not in the slipstream of the preceding vehicle 200 in the step S34, the first shutter mechanism 23 is opened in the step S38. Subsequently, in step S42, the third shutter mechanisms 24 shut off the air flowing into the condensers 13 from the lateral sides 101 of the subject vehicle 100. Subsequently, the process proceeds to the step S40, and the above-described process is performed.

As a modification example, the electric fan 15 may not be actuated. In this case, the determiner 12a determines whether the subject vehicle 100 is in the slipstream of the preceding vehicle 200 as in the step S34. When the subject vehicle 100 is not in the slipstream of the preceding vehicle 200, the controller 12b opens the first shutter mechanism 23 and closes the third shutter mechanisms 24. Thus, the air flows into the condenser 13 from the front side of the subject vehicle 100.

In contrast, when the determiner 12a determined that the subject vehicle 100 is in the slipstream of the preceding vehicle 200, the controller 12b shuts off the air flowing into the air inflow surface 14 of the condenser 13 through the first shutter mechanism 23 by closing the first shutter mechanism 23. Further, the controller 12b allows the air to flow into the air inflow surfaces 14 of the condensers 13 through the third shutter mechanisms 24 by opening the third shutter mechanisms 24. Accordingly, the flow rates of the air flowing into the condensers 13 from the lateral sides 101 of the subject vehicle 100 can be increased without turning on the electric fans 15.

As another modification example, the first shutter mechanism 23 may be opened in the step S38 and the third shutter mechanisms 24 may be opened in the step S42 when it is determined that the subject vehicle 100 is not in the slipstream of the preceding vehicle 200 in the step S34. That is, both the first shutter mechanism 23 and the third shutter mechanisms 24 may be opened.

As another example, the first shutter mechanism 23 may be omitted from the subject vehicle 100. In this case, the air is always allowed to flow into the subject vehicle 100 from the front side, and the air is taken in from the lateral sides 101 of the subject vehicle 100 when the subject vehicle 100 is in the slipstream of the preceding vehicle 200.

The third shutter mechanisms 24 may be an example of a third shutter mechanism 24.

The configuration of the air-conditioning device 10 according to the above embodiment is an example of the present disclosure, and the configuration is not limited and can be achieved by other configurations within the present disclosure. For example, in the second and third embodiments, the condenser 13 may be provided in the engine room and be tilted with respect to the ground 300. The configuration of the air-conditioning device 10 is an example, and another refrigeration cycle including the condenser 13 may be used.

Although the present disclosure has been described in accordance with the embodiments, it is understood that the present disclosure is not limited to the embodiments and structures disclosed therein. To the contrary, the present disclosure is intended to cover various modification and equivalent arrangements. In addition, while the various elements are shown in various combinations and configurations, which are exemplary, other combinations and configurations, including more, less or only a single element, are also within the spirit and scope of the present disclosure.

What is claimed is:

1. An air-conditioning control apparatus for a vehicle, comprising:
    a determiner configured to determine whether a subject vehicle is in a slipstream of a preceding vehicle when the subject vehicle is in autonomous control and following the preceding vehicle, and
    a controller configured to increase a flow rate of air flowing through a condenser for an air-conditioning of the subject vehicle when the determiner determines that the subject vehicle is in the slipstream of the preceding vehicle, wherein
    a first shutter mechanism and a second shutter mechanism are provided in the subject vehicle,
    the first shutter mechanism is configured to allow and shut off an inflow of the air into an air inflow surface of the condenser from a front side of the subject vehicle,
    the second shutter mechanism is configured to allow and shut off the inflow of the air into the air inflow surface of the condenser from a ground side of the subject vehicle,
    when the subject vehicle is out of the slipstream of the preceding vehicle, the first shutter mechanism is open and the second shutter mechanism is closed, and
    the controller is configured to close the first shutter mechanism to shut off the inflow of the air into the air inflow surface through the first shutter mechanism and open the second shutter mechanism to allow the inflow of the air into the air inflow surface through the second shutter mechanism, and thereby increase the flow rate of the air flowing into the condenser from the ground side.

2. The air-conditioning control apparatus for a vehicle according to claim 1, wherein
    an angle $\alpha$ is defined between the air inflow surface of the condenser and a ground, and
    the condenser is arranged in the subject vehicle, and
    an air inflow surface of the condenser is tilted toward the front side of the subject vehicle such that $0°<\alpha<90°$.

3. The air-conditioning control apparatus for a vehicle according to claim 1, wherein
    the controller is configured to control an electric fan located in a path of the air toward the condenser, and thereby increase the flow rate of the air flowing through the condenser.

4. An air-conditioning control apparatus for a vehicle, comprising:
    a determiner configured to determine whether a subject vehicle is in a slipstream of a preceding vehicle when the subject vehicle is in autonomous control and following the preceding vehicle, and
    a controller configured to increase a flow rate of air flowing through a condenser for an air-conditioning of the subject vehicle when the determiner determines that the subject vehicle is in the slipstream of the preceding vehicle, wherein a first shutter mechanism and a second shutter mechanism are provided in the subject vehicle, the first shutter mechanism is configured to allow and shut off an inflow of the air into an air inflow surface of the condenser from a front side of the subject vehicle, the second shutter mechanism is configured to allow and shut off the inflow of the air into the air inflow surface of the condenser from a lateral side of the subject vehicle, when the subject vehicle is out of the slipstream of the preceding vehicle, the first shutter mechanism is open and the second shutter mechanism is closed, and the controller is configured to close the first shutter mechanism to shut off the inflow of the air into the air inflow surface through the first shutter mechanism and open the second shutter mechanism to allow the inflow of the air into the air inflow surface through the second shutter mechanism, and thereby increase the flow rate of the air flowing into the condenser from the lateral side of the subject vehicle.

5. An air-conditioning system for a vehicle, comprising:
an air-conditioner including a condenser configured to air condition an air that flows through the condenser,
a processor programmed to
   determine whether a subject vehicle is in a slipstream of a preceding vehicle when the subject vehicle is in autonomous control and following the preceding vehicle, and
   increase a flow rate of air flowing through the condenser when the subject vehicle is determined to be in the slipstream of the preceding vehicle, and
a first shutter mechanism and a second shutter mechanism provided in the subject vehicle, wherein the first shutter mechanism is configured to allow and shut off an inflow of the air into an air inflow surface of the condenser from a front side of the subject vehicle, the second shutter mechanism is configured to allow and shut off the inflow of the air into the air inflow surface of the condenser from a lateral side of the subject vehicle, when the subject vehicle is out of the slipstream of the preceding vehicle, the first shutter mechanism is open and the second shutter mechanism is closed, and the processor is programmed to close the first shutter mechanism to shut off the inflow of the air into the air inflow surface through the first shutter mechanism and open the second shutter mechanism to allow the inflow of the air into the air inflow surface through the second shutter mechanism, and thereby increase the flow rate of the air flowing into the condenser from the lateral side of the subject vehicle.

6. The air-conditioning system for a vehicle according to claim 5, wherein
   an angle $\alpha$ is defined between an air inflow surface of the condenser and a ground, and
   the condenser is arranged in the subject vehicle such that the air inflow surface is tilted toward the front side of the subject vehicle such that $0°<\alpha<90°$.

7. The air-conditioning system for a vehicle according to claim 5, wherein
   the processor is programmed to control an electric fan located in a path of the air toward the condenser, and thereby increase the flow rate of the air flowing through the condenser.

* * * * *